United States Patent
Bobel et al.

(10) Patent No.: US 12,451,494 B2
(45) Date of Patent: Oct. 21, 2025

(54) CURRENT COLLECTOR PATTERNING FOR ENHANCED ADHESION

(71) Applicant: GM GLOBAL TECHNOLOGY OPERATIONS LLC, Detroit, MI (US)

(72) Inventors: Andrew Clay Bobel, Troy, MI (US); Louis G. Hector, Jr., Shelby Township, MI (US); Erik Brandon Golm, Warren, MI (US); Shaomao Xu, Sterling Heights, MI (US); Raghunathan K, Troy, MI (US); Anil K. Sachdev, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 408 days.

(21) Appl. No.: 17/872,188

(22) Filed: Jul. 25, 2022

(65) Prior Publication Data
US 2024/0030458 A1 Jan. 25, 2024

(51) Int. Cl.
H01M 4/82 (2006.01)
H01M 4/04 (2006.01)
H01M 4/66 (2006.01)

(52) U.S. Cl.
CPC .......... H01M 4/82 (2013.01); H01M 4/0404 (2013.01); H01M 4/661 (2013.01)

(58) Field of Classification Search
CPC ...... H01M 4/82; H01M 4/0404; H01M 4/661; H01M 4/0435; Y02E 60/10
See application file for complete search history.

(56) References Cited

U.S. PATENT DOCUMENTS

| | | | | |
|---|---|---|---|---|
| 4,515,621 A | * | 5/1985 | Gunthner | C03B 13/16 65/193 |
| 2008/0023166 A1 | * | 1/2008 | Mayer | D21F 5/187 162/207 |
| 2010/0112452 A1 | * | 5/2010 | Nishimura | H01M 4/664 429/231.95 |
| 2011/0281170 A1 | * | 11/2011 | Mitsuda | H01G 11/70 29/25.03 |
| 2011/0311854 A1 | * | 12/2011 | Takeuchi | H01M 6/14 429/129 |
| 2014/0272583 A1 | * | 9/2014 | Hellring | C23C 22/34 429/231.95 |
| 2022/0013805 A1 | * | 1/2022 | Sakamoto | H01M 4/625 |

OTHER PUBLICATIONS

Kim, Tae Kwon, Xifei Li, and Chunlei Wang. "Temperature dependent capacity contribution of thermally treated anode current collectors in lithium ion batteries." Applied surface science 264 (2013): 419-423. (Year: 2013).*

* cited by examiner

Primary Examiner — Keith D. Hendricks
Assistant Examiner — Mayela Aldaz

(57) ABSTRACT

A method of making a battery current collector foil includes heat treating a foil sheet and mechanically roughening the heat treated foil sheet to create a surface roughness of between 2-4 μm. The heat treating and mechanical roughening of the foil sheet provides improved coating adhesion. One of an anode and cathode coating is then applied to the roughened, heat treated, foil sheet.

3 Claims, 1 Drawing Sheet

CURRENT COLLECTOR PATTERNING FOR ENHANCED ADHESION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a method of making a battery current collector foil.

Electrolytic copper foil is used as the current collector for the anode of lithium-Ion batteries and aluminum foil is used as a cathode current collector for lithium-ion batteries. The copper and aluminum foils are coated with an anode or a cathode coating. Poor adhesion or delamination of the coating can lead to loss of electronic connectivity during service and cell failure.

SUMMARY

According to an embodiment of the present disclosure, a method of making a battery current collector foil, includes heat treating a foil sheet and mechanical roughening the heat treated foil to create a surface roughness of between 1-10 μm, between 2-6 μm and preferably between 2-4 μm. One of an anode and cathode coating is then applied to the roughened, heat treated, foil sheet.

According to embodiments of the present disclosure, the heat treating is performed in one of an oven and a furnace at a temperature of between 300-400° C.

According to embodiments of the present disclosure, the heat treating is performed with heated rollers at a temperature of between 300-400° C.

According to embodiments of the present disclosure, the mechanical roughening is performed with rollers.

According to embodiments of the present disclosure, the rollers include sandpaper.

According to embodiments of the present disclosure, the roller surfaces are knurled.

According to embodiments of the present disclosure, the roller surfaces are patterned.

According to embodiments of the present disclosure, the foil is one of an aluminum foil and a copper foil.

According to embodiments of the present disclosure, the applying one of an anode and cathode coating includes a slurry coating.

According to embodiments of the present disclosure, the applying one of an anode and cathode coating includes one of a lithium metal rolling and a lithium metal dipping.

The mechanical surface treatment and heat treatment process increases the adhesion characteristics of the cathode (Al) and anode (Cu) battery current collector foils to the active material (slurry, Li metal, etc.). This method includes a surface roughening treatment during a rolling process and, for Cu foils a heat treatment to create a lithiophilic copper oxide surface layer for enhanced bonding. A rough roller is used to roughen the surface of the foil sheet. Better adhesion leads to better long cycle capacity retention.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Lithium-ion batteries are widely used to power various types of electronic devices including cell phones, lap-top computers, power tools and automobiles. A lithium-ion battery is a type of rechargeable battery including cells in which lithium ions move from the negative electrode through an electrolyte to the positive electrode during discharge and back when charging. The four major components of the lithium-ion battery are the cathode, anode, separator, and electrolyte. The movement of the lithium ions creates free electrons in the anode which creates a charge at the positive current collector. The electrical current then flows from the current collector through a device being powered (cell phone, computer, motor, etc.) to the negative current collector. The separator blocks the flow of electrons inside the battery. Electrolytic copper foil is often used as the current collector for the anode of lithium-Ion batteries and aluminum foil is used as a cathode current collector for lithium-ion batteries. The copper and aluminum foils are coated with an anode or a cathode coating. By way of example, the cathode coating can include NCM, NCA, NCMA, LiFeP, LMO, LCO, LNO, Sulfur based materials (LiS) The anode coating can include Graphite, Si, SiOx, Li Metal and other anode coatings.

Figure 1:
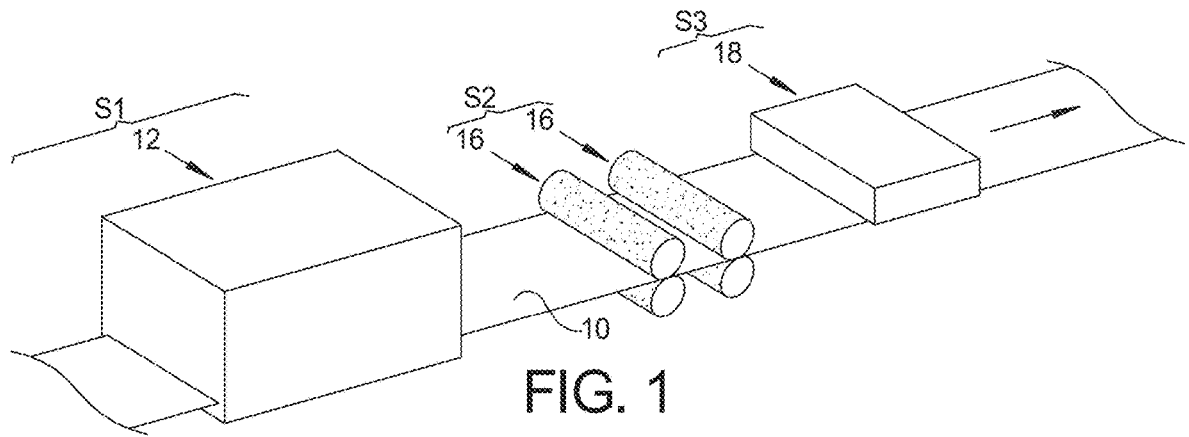
FIG. 1 is a schematic view illustrating a process of making a battery current collector foil according to a first embodiment.
Figure 2:
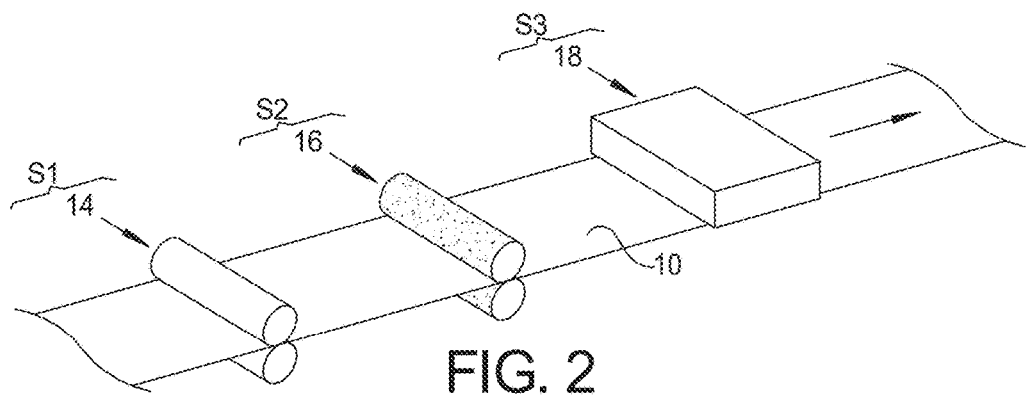
FIG. 2 is a schematic view illustrating a process of making a battery current collector foil according to a second embodiment.

With reference to FIGS. 1 and 2, a method of making a battery current collector foil includes providing a foil sheet 10 of copper or aluminum. The foil sheet 10 is preferably rolled to a near mirror finish. At stage S1, the foil sheet 10 is heated in a furnace/oven 12 (FIG. 1) or between a pair or pairs of heated rollers 14 (FIG. 2) to a temperature of between 300-400° C. In the case of a copper sheet, the heating creates a formation of CuO and $Cu_2O$ on the surface of the copper sheet.

CuO is lithiophilic and promotes better adhesion than lithiophobic bare copper and improves lithium cycling behavior. The Cu oxidation also increases the surface roughness of both sides of the current collector foil. As an example, a 6 nm thick passivation layer of copper oxide ($Cu_xO$—where x denotes a number of Cu molecules per O molecule) can form at 300° C. for 30 min with air flow. An oxidation rich environment via air flow accelerates the oxide growth and reduces the amount of time for the heat treating process. Accordingly, a high airflow oven or furnace 12 (FIG. 1) can be used to increase the rate of oxide growth and reduce the heating time. The heat treatment also leads to better elongation of the sheet 10 and reduces a tearing tendency during cell assembly.

The heat treated foil sheet 10 is then mechanically roughened between mechanically roughened rollers 16 at stage S2 to create a surface roughness of between 2-4 µm on both sides of the foil sheet. Surface roughness results from the mechanical imprint of the roller surface. The extent to which the imprint of the foil surface is representative of the roller surface depends upon different factors_(e.g. roller forces applied to the foil). The roller surface is designed to prevent tearing of the foil as it locally deforms into the raised features on the foil. In particular, a surface roughness refers to a mean distance that the foil sheet 10 is deformed from flat. The mechanically roughened rollers 16 can include one of a sandpaper sleeve over a mandrel, a riblet film, a knurled surface or a laser patterned roller to create a mean surface roughness of approximately 3 µm. According to an example embodiment, sandpaper with FEPA grit number between P2000-P4000 can be used as a roller sleeve. Back-up rollers 16 can be provided for allowing roller change-over with limited or no interruption in the mechanical roughening process. In particular, during roller change-over, the back-up rollers 16 can be engaged to the foil sheet and then, the primary rollers 16 can be changed-out without interrupting the roughening process.

The heating and mechanical roughening provides improved coating adhesion. One of an anode and cathode coating is then applied at stage S3 to the roughened, heat treated, foil sheet 10 by a coating device 18. The coating material and process can include a slurry coating for graphite and/or Si based cells, Li metal rolling, and liquid Li metal dipping, etc. for lithium metal battery cells. It should be understood that alternative coating methods can be used including, rolling, dipping, and spraying.

It should be understood that the heat treating and surface roughening steps S1, S2 can be performed sequentially, one right after the other in the same location, or can be performed at separate times and/or in separate locations. Further, the heat treating and surface roughening steps can be reversed so that the surface roughening step is performed prior to the heat treating step.

Figure 3:
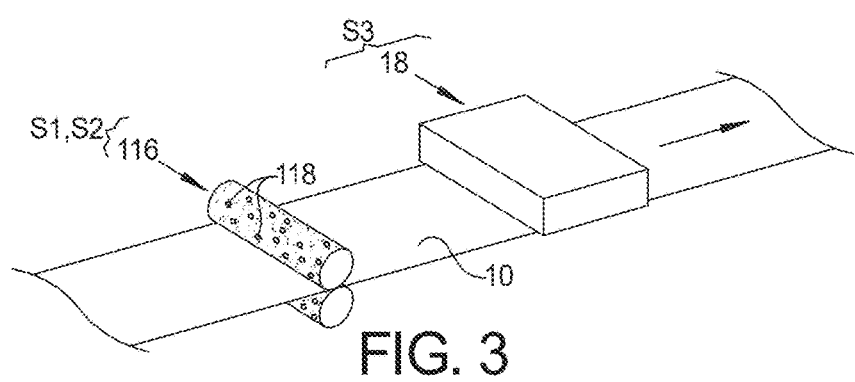
FIG. 3 is a schematic view illustrating a process of making a battery current collector foil according to a third embodiment.

In addition, as shown in FIG. 3, the heat treating and surface roughening steps S1, S2 can be performed simultaneously. In particular, heated roughening rollers 116 can be used to heat and roughen the foil sheet 10 at the same time. The heated roughening rollers 116 can include perforations 118 that flow oxygen or air through the roller 116 surface directly onto the foil sheet 10. The oxygen or air flow through the perforation helps to increase the rate of oxidation.

The heat treatment and the mechanical surface treatment of the foil sheet 10 of the present disclosure, either at the foil supplier side, or in a line-to-line process at the cell manufacturing plant, provides better adhesion of a slurry or Li metal to the current collector 10. Accordingly, alternative surface etchings and surface treatments for enhancing surface adhesion can be avoided.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

What is claimed is:

1. A method of making a battery current collector foil sheet, comprising:
   heat treating and mechanically roughening a foil sheet by at least one heated roller to create a nominal surface roughness of between 2-4 µm, increasing oxidation of the foil sheet by flowing air through perforations in the heated roller onto the foil sheet; and
   applying one of an anode and cathode coating to the roughened, heat treated, foil sheet, wherein the applying one of an anode and cathode coating includes lithium metal dipping.

2. The method of making a battery current collector foil sheet according to claim 1, wherein the heat treating is performed at a temperature of between 300-400° C.

3. The method of making a battery current collector foil sheet according to claim 1, wherein the applying one of an anode and cathode coating further includes a slurry coating.

\* \* \* \* \*